Feb. 2, 1926.  
A. W. ANDERSON ET AL  
WATER TREATING SYSTEM  
Filed Sept. 7, 1922  
1,571,225  
3 Sheets-Sheet 3
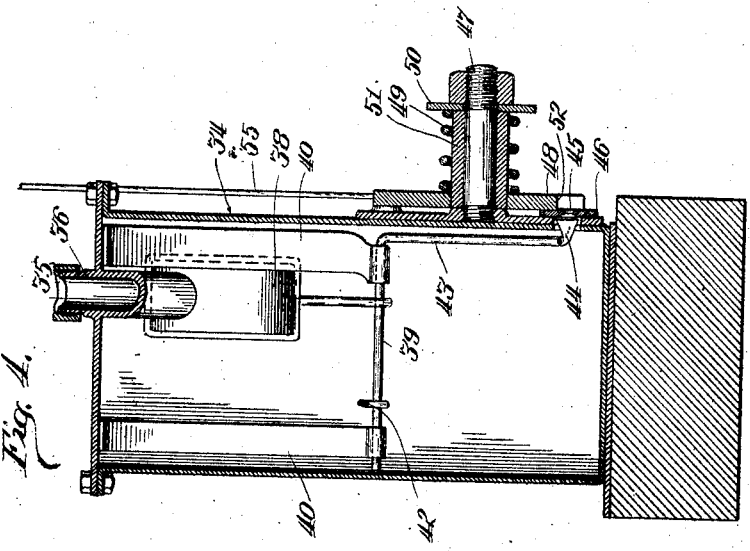
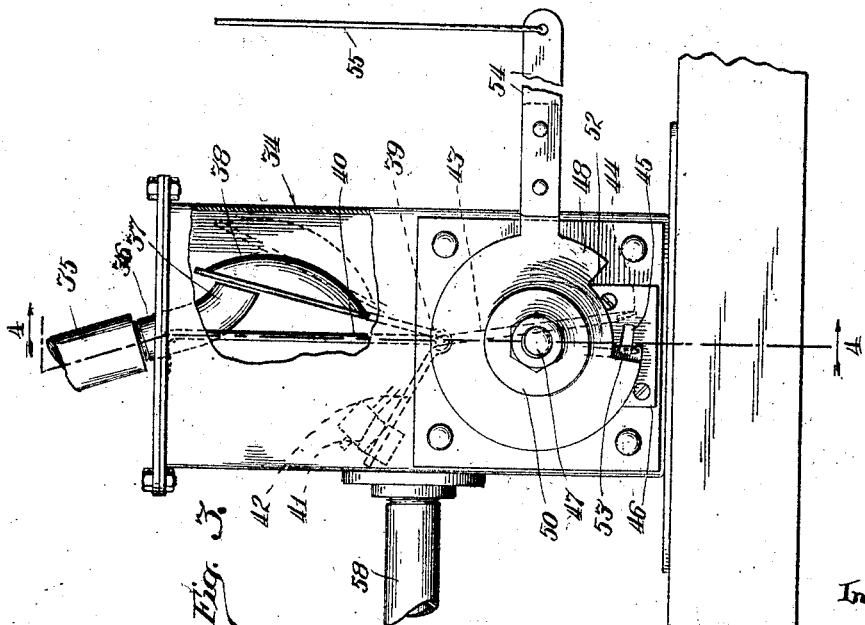

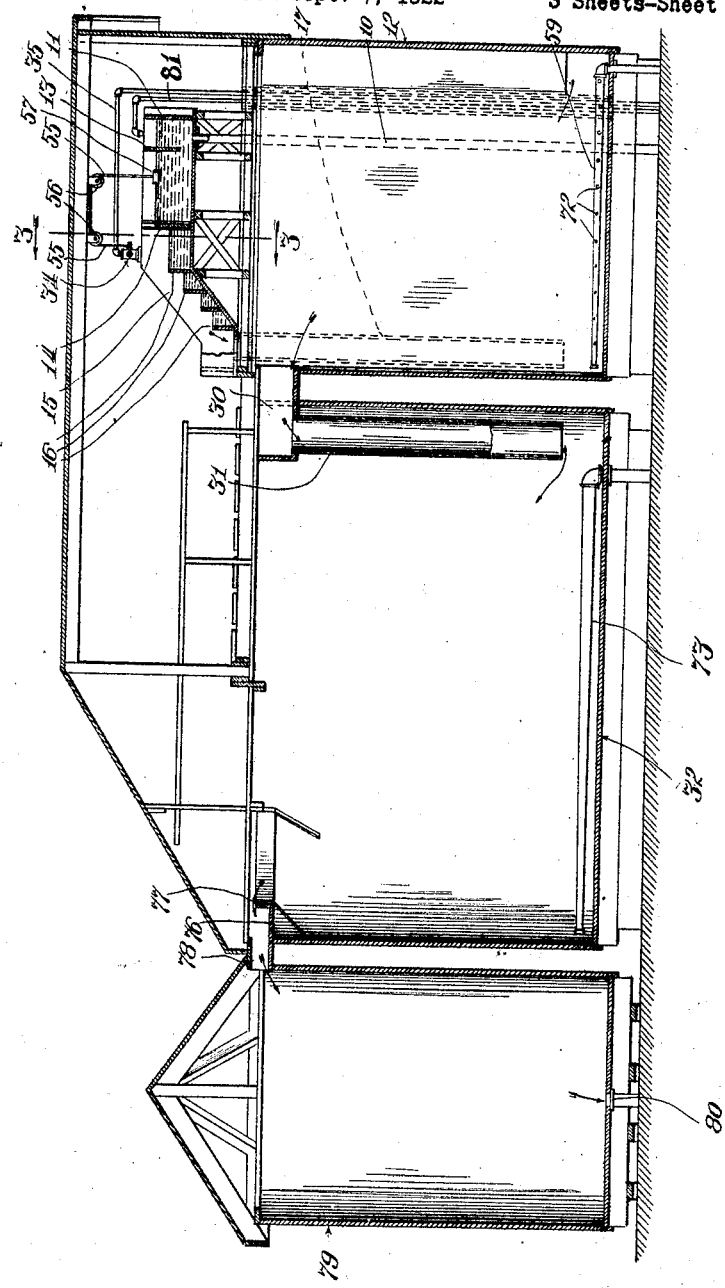

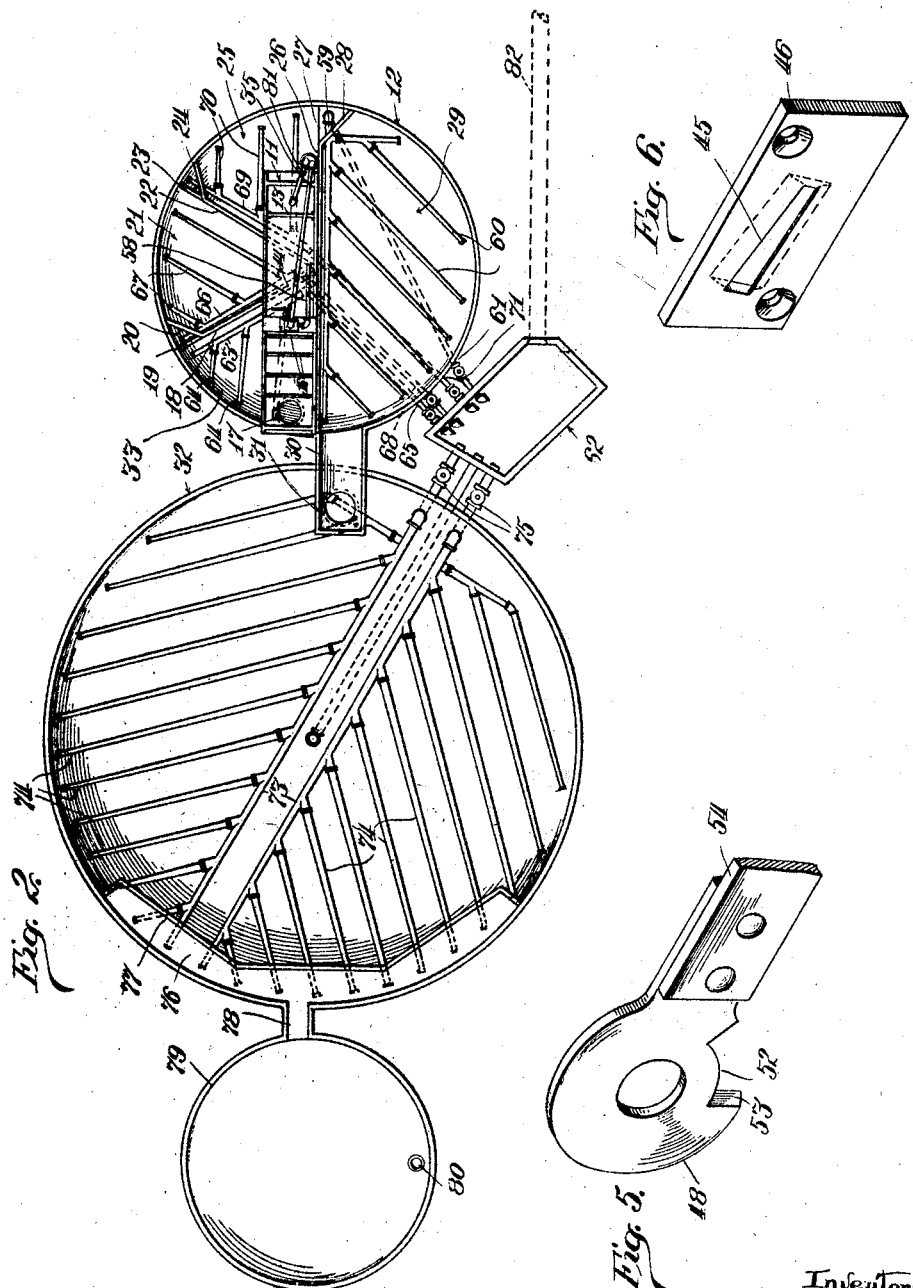

Patented Feb. 2, 1926.

1,571,225

UNITED STATES PATENT OFFICE.

ANDREW W. ANDERSON, OF AURORA, ILLINOIS, AND JAY R. HICKOX, OF LINCOLN, NEBRASKA.

WATER-TREATING SYSTEM.

Application filed September 7, 1922. Serial No. 586,554.

*To all whom it may concern:*

Be it known that we, ANDREW W. ANDERSON and JAY R. HICKOX, citizens of the United States, and residents of Aurora, in the county of Kane and State of Illinois, and of Lincoln, in the county of Lancaster and State of Nebraska, respectively, have invented certain new and useful Improvements in a Water-Treating System, of which the following is a description, reference being had to the accompanying drawings which form a part of our specification.

Our invention relates to a water treating, softening and settling system whereby water especially intended for use in boilers, such as locomotives and the like, may be purified and freed from incrusting solids and all suspended and organic matter contained in the raw water which are deleterious to locomotives or boilers wherein the water is brought to excessively high temperatures.

The object of our invention is to provide a system wherein the treatment is carried out with the use of suitable chemical solutions, means being provided whereby the chemicals will be introduced into the raw water in proper, suitable quantities and in a manner which will induce a thorough intermingling thereof and proper reaction to take place, due to means which are so arranged that a constant self agitation of the water will be brought about; while at the same time proper reaction and sedimentation may be effected during the passage of the water through the system.

Our invention also contemplates means whereby a proper draining or cleaning of the system, that is to say of the respective tanks or portions thereof, may be effected in a complete and thorough manner without necessarily interfering with the continuous operation of the system.

The invention, its objects and advantages will all be more fully comprehended from the detailed description of the accompanying drawings, wherein:—

Figure 1 is a sectional elevation of the main portions of our system.

Figure 2 is a top sectional plan of the construction disclosed in Figure 1.

Figure 3 is a detail view taken substantially on the line 3—3 of Figure 1 looking in the direction of the arrows, but merely disclosing the chemical feed device.

Figure 4 is a vertical sectional view taken on the line 4—4 of Figure 3 looking in the direction of the arrows.

Figure 5 is a detail view in perspective of a portion of the control mechanism shown in Figures 3 and 4.

Figure 6 is a detail view in perspective of the discharge orifice of the container or tank shown in Figures 3 and 4.

In the particular exemplification of the invention, as illustrated in the drawings, the raw water to be treated is forced in any suitable manner from a source of supply through conduit 10 into a receptacle or mixing box 11, which is preferably arranged at an elevation or suitably supported on the large reaction vessel or receptacle 12. The receptacle 11 may be open to the atmosphere and is provided with a baffle or partition 13 disposed downwardly from the top of the receptacle to a point in close proximity to the bottom so as to provide a compartment at one end of the mixing box or receptacle which communicates, adjacent the bottom of the receptacle, with the adjacent compartment or main portion of the receptacle. The last mentioned portion or compartment is in turn provided with a baffle or weir at 14 at the outlet end thereof. This outlet or discharge end of the receptacle in the particular exemplification is shown provided with a downwardly sloping portion or chute at 15 which is also provided with a number of baffles or weirs 16, which are preferably disposed entirely across the chute. The water, in flowing out of the receptacle 11, is caused to splash and eddy in the respective divisions intermediate of the baffles or weirs 14 and 16 of the discharge chute 15 and as a result to become thoroughly agitated. The lower end of the discharge portion or chute 15 is provided with an outlet preferably in the nature of a conduit 17 extending to a point adjacent to the bottom of the reaction receptacle or tank 12.

The receptacle or tank 12 is preferably formed to delay or increase the travel of the treated water therethrough and as a method for producing this increased travel we have shown the container provided with a partition 18 which extends upwardly from the bottom of the receptacle or tank 12 to a point adjacent the top thereof, with the end of the partition 18 adjacent to the wall of the receptacle or tank 12 being of slightly less height at the point indicated at 19. Intermediate of the partition 18 and the wall of the receptacle or tank and shown disposed in a tangential manner, we provide a partition 20 which is preferably of substantially the same height as the major portion of partition or wall 18. The partition 20, with the adjacent portion of partition 18, provides a conduit or vertical passage for the water flowing over the reduced portion 19. The partition 20 is slightly removed from the bottom of the tank, or provided with an opening in the lower end thereof, so that water may flow into a compartment 21 which is formed by the partitions 18 and 20 and a partition 22, which, like partition 18, extends radially from a central point in the tank to the wall of the tank 12; while the point adjacent to the side of the tank is of less height to permit flow of the water downwardly at the point 23 between the partition 22 and the tangentially disposed partition 24, which, like partition 20, is formed at the bottom to permit flow of water into the next succeeding compartment 25 intermediate of the partitions 22 and 26; the partitions 22 and 24 constituting a conduit or downward passage for the water. The partition 26, like partitions 22 and 18, is also reduced at 27 to permit the water to overflow into the conduit or passage intermediate of the partition 26 and a partition 28, which latter, like the previously described tangentially disposed partitions 20 and 24, is provided with an opening at the bottom to permit the water to flow into a chamber or compartment 29.

The purpose in providing the receptacle or tank 12 with the series of partitions and compartments is to increase the travel of or rather the time for the water to pass through the tank in order that thorough reaction may take place; the partitions in reality constituting a series of conduits for the water for conveying the same from one chamber into the other; it being understood, of course, that after the tank 12 has been completely filled, the water will flow gently in an undulating path through the tank 12 in a more or less quiescent state without inducing agitation.

The tank or receptacle 12, adjacent the upper end thereof and communicating with the last compartment 29, is provided with a flume at 30 which is provided with the outlet conduit or pipe 31 and in turn leads toward the bottom of a receptacle or settling tank 32.

With the construction shown and described, the water flows by gravity over the various weirs 16 in the mixing box or receptacle 11 and is thence discharged through conduit 17 into a compartment 33 intermediate of the transversely disposed partition 26, and the partition 18; the water filling the compartment 33 until it overflows into the passage or conduit at 19 and discharges beneath the partition 20 into the next compartment 21, thence down through the passage at 23 and out at the bottom into compartment 25; thence down through the passage at 27 and out into compartment 29. When the compartment 29 has been filled sufficiently to a level with the flume 30, the rising water will flow through flume 30, thence down through discharge conduit 31 into a settling tank or receptacle 32.

Mounted at a proper point above what may be termed the mixing box or receptacle 11, namely at a point where the water overflows the weir 14, is a suitable container or receptacle 34. This container or receptacle 34, which is shown in detail in Figures 3 and 4, is adapted to receive the lime and soda ash or other suitable solution from a suitable source of supply by means of supply line 35 which may be connected with the ejection side of a suitable pump whereby to force the lime and soda ash solution into the receptacle 34. The receptacle 34 is provided with an inlet tube 36 with which the conduit 35 is connected. The tube 36 is suitably supported on the receptacle or container 34 and has its inner end preferably provided with a forwardly projecting curvature as at 37, disposed toward and in close proximity to a dash-plate or element 38. The dash-plate 38 is preferably dished or concaved as shown in Figure 3 in order that the incoming solution may impinge against the dash plate or element 38 and exert pressure thereon. The dash-plate or element 38 is pivotally mounted in any suitable manner at its lower end on what may be termed the journal 39 and which in turn is mounted in any suitable manner on the side walls of the receptacle or container 34, or rotatably mounted in the ends of the straps or brackets 40, 40 shown suspended from the upper end of the receptacle or container 34. The dash-plate or element 38 is counterbalanced by a suitable weight 41 which may be adjustably secured to the stem or rod 42 and which is secured to the journal 39; the counterweight 41 being so arranged and of such weight as to normally maintain the dash-plate or element 38 in the position shown in full lines in Figure 3, namely in juxtaposition to the curved end 37 of the inlet tube 36.

The journal 39 is provided with the downwardly disposed arm or rod 43, which may if desired, be a continuation of the journal as shown in Figure 4; and the lower end thereof is bent or disposed toward the side wall of the receptacle or vessel 34 as shown at 44 in Figure 4.

The side wall of the receptacle or vessel 34, adjacent the bottom thereof, in the particular exemplification, is provided with an outlet, the orifice whereof is preferably formed with a taper and at an inclination as shown at 45 in Figure 6, where the outlet orifice is shown formed in a plate or member 46 which is secured to the side wall of the receptacle or container 34 as shown in Figure 4. The opening in the side wall of the receptacle or vessel 34 may be large enough to receive the bent end 44 of the arm or wiper rod 43. The side of the container is shown provided with a stud or extension 47, supporting an oscillatably mounted disc valve or flow regulating member 48 which is maintained in snug relation with the plate 46 by means of the pressure-applying spring 49, held in place by a washer 50 which is secured in any suitable manner on the end of the stud 47; the stud being provided with a thimble 51, which is encircled by the spring 49. The outer end of stud 47 is provided with a nut and the washer 50; the washer 50 maintaining the thimble 51 in snug relation with the plate 46. The disc valve or regulating member 48 has a portion of its perimeter shown cut away segmentally at 52, see Figure 5. The cut away is to an extent preferably greater than the length of the discharge orifice 45 previously referred to; and the cut-out portion 52 at one end thereof is preferably made by beveling the disc as at 53 whereby to assist the shutting off operation or regulation of the outflow from the vessel or receptacle 34. The disc valve or member 48 is provided with a radially disposed arm 54, to which is secured a suitable flexible element or cord 55 which is adapted to pass about over-head pulleys as at 56 in Figure 1, while the other end of the flexible element or cord 55 is provided with a suitable float member 57, which is disposed in the main portion or water-receiving chamber of the mixing box or receptacle 11. The float 57 and the lever or arm 54 are so correlated that when the float 57 moves downward by reason of the receding water level in the mixing box or receptacle, its weight will be sufficient to pull arm or lever 54 upwardly and cause the disc valve 48 to rotate in a manner which will close off the port 45, either partially or entirely as the case may be; while on the other hand the weight of the arm or lever 54 is such that when the float 57 is brought upward by the rising water level in mixing box or receptacle 11, the disc valve 48 will rotate in the opposite direction (to-wit clockwise direction in Figure 3) and thereby partially or entirely open the outlet orifice 45 and permit flow of the lime and soda ash solution from receptacle 34.

As is evident from the construction shown, the amount of chemical solution discharged into the mixing box or receptacle 11 will vary and be proportionate to the water level and therefore to the amount of water passing over weir 14 in receptacle 11; the chemical solution being discharged at a point where the water dashes or flows over the weir 14 and therefore at a point where agitation is begun and continued by reason of the succeeding weirs, with the result that an intermingling of the raw water and chemical or treating solution is induced. The receptacle or vessel 34, at a suitable point above the discharge orifice 45, is provided with an overflow or outlet conduit 58, whereby excess solution will be returned to the original chemical-holding tank or source of supply.

In order to prevent the possibility of the discharge orifice in vessel 34 becoming clogged by the lime and soda ash solution, we provide the orifice scraper element consisting of the rod or arm 43 with the bent and preferably enlarged end 44 and which is caused to oscillate back and forth across the discharge orifice by the repeated impulses resulting from the variations in pressure or impact caused by the treating solution discharging into vessel or receptacle 34 through conduit 36 and impacting against the dash member or vane 38, whereby the journal 39 (to which arm or rod 43 is secured or made a continuation of) is caused to rock in its bearings. Reduction or lack of pressure being exerted against the dash member 38 permits the weighted arm 42 to rock the journal 39 in the opposite direction namely back to normal position.

In order that the receptacle 12, which constitutes the reaction tank, and the receptacle 32, which constitutes the settling tank, may be properly cleaned and the sludge and sediment withdrawn therefrom, we provide the bottom of compartment 29 of the tank 12 with a take-off conduit or pipe 59, of sufficient diameter, which in turn is provided with a plurality of ramifications or branch lines as at 60 at suitable intervals apart and disposed at an acute or less than ninety degree angle to the pipe 59; the branch pipes, like the main pipe, preferably tapering toward the outer ends. The take-off conduit 59 extends out through the bottom of the receptacle or tank 12 and communicates with a valved conduit 61 which in turn communicates with a sludge box or receptacle 62. The bottom of the compartment 33 is provided with a similar take-off conduit 63 having a plurality of similar ramifications or branch lines as at 64 and the take-off conduit 63 passes out through the bottom of the tank and communicates with a valved conduit 65 which leads to the sludge box or receptacle 62; while the compartment 21 is provided with a take-off conduit 66 having a number of ramifications or branches 67; the take-off conduit 66 being disposed through the bottom of the tank and communicating with the valved conduit 68 which also leads to the sludge box or receptacle 62; and the compartment 25 is provided with a take-off conduit 69 having branch lines or ramifications as at 70; the take-off conduit 69 being disposed through the bottom of the tank and connected with the valved conduit 71 which leads to the sludge box or receptacle 62. The take-off conduits and their respective ramifications or branch lines are all preferably tapered toward their outer ends as shown in Figure 2, to induce proper outflow therethrough; while the branch pipes are all preferably disposed at an acute or substantially forty-five degree angle from the main conduits in order to aid the flow therethrough and reduce the eddies at the point of intersection and therefore reduce the flow loss. The conduits and their respective branch pipes are all preferably provided with a plurality of perforations on the lower sides thereof and at suitable points apart as at 72, see Figure 1; the arrangement of the holes on the lower sides inducing a complete evacuation or withdrawal of the sludge or sediment on the bottom of the tanks.

The bottom of the tank or receptacle 32 is shown provided with a pair of diametrically disposed take-off conduits or pipes 73 which in turn are provided with oppositely disposed and preferably tangentially extending branch lines or ramifications 74 which are spaced apart to extend throughout the bottom of the tank and cause withdrawal of the sediment or sludge from any part of the tank. The take-off conduits 73 extend to the exterior of the tank or receptacle 32 where they are provided with suitable valved connections as at 75 in Figure 2 which lead to the sludge box or receptacle 62. The take-off conduits and branch lines, like in the construction employed in tank or receptacle 12, are also preferably tapered toward the outer ends, to prevent clogging of the respective conduits; while the acute angular arrangement or substantially forty-five degree connections or branches prevent the setting up of eddy currents adjacent the point of communication between said connections and the main conduits or pipes.

The upper end of the settling tank or receptacle 32, along one side thereof, preferably diametrically opposite to the inlet 31, is provided with a "skimmer" preferably consisting of a ledge or horizontally disposed baffle 76 which in turn is provided with a vertically disposed flange or ridge as at 77 over which the water is caused to flow when the level of the water rises to the plane of the ridge 77. The upper end of the receptacle or tank 32, at a point coincident with the ledge 76 and ridge 77, is provided with a flume 78 through which the outflowing water is caused to pass and whereby it is conveyed into a collecting tank or receptacle 79, from whence the clarified water may be drawn by means of a suitable outlet conduit 80 and conveyed to a storage or road-side tank.

Our improved system also contemplates the introduction of sulphate of iron when necessary. This may be accomplished by means of a conduit or pipe 81 leading from a suitable tank or supply. The conduit or pipe 81 preferably terminates at a point above the one end of box or receptacle 11 and intermediate of baffle or partition 13 and the adjacent end of the box, namely at a point where the raw water is introduced into the receptacle or mixing box 11.

It will be understood, of course, that with the mixing box at an elevation as shown in Figure 1 the water and chemical supply will necessarily have to be forced by means of suitable pumps into the receptacle or mixing box 11, from which point outflow and agitation or mixing will be caused through gravity and other extraneous power need not be employed to carry out the mixing, reaction and skimming operations of our improved system.

In operation, the raw or untreated water is forced from a suitable source of supply through the conduit 10 up into the receptacle or mixing box 11. If the water is of a certain nature, then the iron sulphate solution is forced through the conduit or pipe 81 in predetermined quantities and delivered into the receptacle or mixing box 11 at a point where the water enters the same and therefore where a more or less thorough intermingling will be induced. As the supply of water increases in the receptacle or mixing box 11, it will overflow the weir 14 and at the same time raise the float member 57, which allows the arm 54 of disc valve 48 to drop downwardly. Such movement of the arm 54 and rotation of disc valve 48 opens the outlet orifice 45 of the lime and soda ash solution receptacle 34 and a quantity of treating or chemical solution in keeping with the quantity of water overflowing weir 14 will be admitted. The water overflowing the weir 14 induces a splashing or agitation of the water and intermingling of the chemical solution therewith and the mixture will be further agitated and more thoroughly intermingled in the successive falls over the respective weirs. As a result, a complete mixing is brought about and reaction is begun, while complete reaction takes place during the passage of the water with the solution through the extended path leading through the various compartments formed in the reaction tank or receptacle 12, before it rises a sufficient height in the last compartment 29 of said tank where it can flow through the flume 30 and thence downward through the conduit 31 into the settling tank 32.

As is apparent from the construction shown and described herein, the water is made to pass through a mixing stage in the receptacle or mixing box 11; then through a reactionary stage in the respective compartments of the reaction tank or receptacle 12 and finally through a sedimentation stage in the settling tank 32, with the result that all of the dissolved incrusting solids are precipitated, both in the reaction tank or receptacle 12 and the settling tank or receptacle 32; the precipitate carrying with it all suspended and organic matter in the water. With the settling tank 32 provided with the outlet flume 78 as described and preceded by what may be termed a "skimmer" composed of elements 76 and 77, it is evident that only clear water from the upper level in tank 32 is admitted into the collecting tank or receptacle 79. The precipitate and sludge gathering in the reaction tank or receptacle 12 and settling tank or receptacle 32 will all be drawn off through the sludge pipe system, arranged along the bottom of said tanks, when the respective valves of said sludge pipe system have been opened; the construction and arrangement of said pipes causing a complete withdrawal of the sludge which is conveyed to a common sludge-box or receptacle, from which it may be drained to any suitable point by means of an outlet pipe 82, see Figure 2.

We have shown our system, namely the respective tanks arranged in suitable housings and overhead structures whereby access to the respective elements may be had for inspection, repair and the like and foreign matter prevented from entering or falling into the respective tanks or receptacles. Furthermore, with the chemical control or equalizing receptacle 34 constructed as hereinbefore described, it is evident that clogging of the outlet orifice will be prevented by reason of the oscillations given to the member 43 through the impulses imparted to the journal by the incoming chemical solution impacting against the element 38 and the counteraction of the weighted arm.

The construction shown and described we believe is a simple embodiment of the invention; presenting an operative system whereby proper treatment of water may be carried out; the system having been described in terms employed merely as terms of description and not as terms of limitation, as structural modifications in the general arrangement and construction of the various receptacles and the means for controlling the flow of the water are possible and may be made without, however, departing from the spirit of our invention.

What we claim and desire to secure by Letters Patent is:—

1. A system of the character described, comprising a water and treating solution receiving receptacle formed to permit the fluid to flow therefrom by gravity, said receptacle being provided along the path of the outflowing fluid with baffles or weirs whereby a mixing of the water and treating solution is induced, a second receptacle provided with a pluralty of compartments having communication with each other alternately at top and bottom whereby the water is given an increased path, a third receptacle, means communicating with the upper end of the final compartment of the second mentioned receptacle whereby the treated water is conveyed to said third receptacle and delivered adjacent the bottom thereof, and means arranged adjacent the upper end of the third receptacle for withdrawing and skimming the water from its upper level.

2. In a system of the character described, a mixing receptacle provided with a declining outlet a plurality of weirs or baffles arranged at different levels, transversely of said outlet, means for conveying the raw water to be treated into one end of said receptacle, and float controlled means for discharging variable quantities of a treating solution into said receptacle, proportionate to the water flowing therethrough, said means being controlled by the water level in said mixing receptacle.

3. In a system of the character described, a mixing receptacle through which the water to be treated is made to flow, a treating solution receptacle communicating with said mixing receptacle, means controlled by the quantity of water in said mixing receptacle whereby the quantity of treating solution discharged is proportionate to the quantity of water flowing therefrom, and means disposed at the discharge end of the receptacle whereby self agitation and mixing of the water and treating solution is induced.

4. In a system of the character described, a mixing receptacle provided with a declining outlet and a plurality of baffles or weirs at various levels therein whereby the outflowing water is subjected to successive swirls and "splashes", and automatic means, adapted to be controlled by the fluid level in said mixing receptacle, whereby predetermined quantities of treating solution may be introduced into said receptacle.

5. In a system of the character described, a mixing receptacle disposed at an elevation and having a declining discharge provided with a plurality of transversely disposed weirs successively arranged at different levels whereby the outflowing water is given successive falls and swirls, a second receptacle disposed in a lower plane and adapted to receive the fluid discharging from the mixing receptacle, said second receptacle being provided with a series of chambers, the successive chambers communicating with each other alternately at top and bottom so as to provide the treated water with an extended path, a flume connected with the upper end of the last chamber of said receptacle and having a depending discharge conduit, and a settling receptacle adapted to receive the treated water from the said conduit adjacent to the bottom of said settling receptacle, said last receptacle being formed to allow discharge from the upper end thereof at a point removed from said discharge conduit.

6. A system of the character described, comprising adjacently arranged tanks, a flume connection between the upper ends of said tanks, a mixing box mounted above one of said tanks and provided with a declining discharge end communicating with said last mentioned tank, the declining discharge end of the mixing box being provided with a plurality of weirs successively arranged at different levels, and automatic means controllable by the water level in the water receiving portion of said mixing box, whereby predetermined quantities of treating solution are admitted into the discharging end of said mixing box proportionate to the flow of water therethrough.

7. In a system of the character described, comprising a mixing box or receptacle, a reaction tank and a settling tank, the mixing box being superposed on the reaction tank and having a weir-discharge communicating with said reaction tank, the weirs being arranged at different levels transversely of the discharge so as to induce successive swirls and splashes treating solution introducing means communicating with the weir discharge end of said mixing box, float controlled means operable by the fluid level in the mixing box whereby the quantity of treating solution discharged by said introducing means is regulated, and ramified means disposed throughout the bottom of the reaction tank, with each ramification provided with a plurality of inlets for withdrawing the precipitate or sludge from said tank.

8. In a system of the character described, a treating solution holding receptacle provided with a discharge orifice at the lower end thereof and an inlet at the upper end thereof, a pivotally mounted member adapted to move across said discharge orifice, and means operatively connected with said member and correlated to said inlet so as to have the incoming solution impinge thereagainst, whereby said means will be oscillated and said member caused to move across the discharge orifice.

9. In a system of the character described, a solution holding receptacle having a discharge orifice, a counterbalanced vane tiltably mounted in said receptacle, means, controlled by said vane, adapted to move across the discharge orifice, and means whereby the incoming fluid is discharged against said vane and the latter with said means caused to oscillate.

10. In a system of the character described, a solution-holding receptacle provided with an elongated sloping and tapering discharge orifice, a disc valve, rotatably mounted on said solution-holding receptacle, provided with a segmental cut-away portion adapted to register with said discharge orifice when the disc valve is rotated, means whereby said disc valve is normally rotated to orifice uncovering position, and float means operatively connected with said disc valve, adapted to counterbalance said first means and thereby move the disc valve into orifice covering position direction as the water level in said first mentioned receptacle recedes.

11. A system of the character described, comprising a plurality of receptacles or tanks constituting a mixing receptacle, a reaction receptacle, a settling receptacle and a collecting receptacle, the mixing receptacle being superposed on the reaction receptacle and adapted to discharge its contents by gravity into the reaction receptacle, the mixing receptacle being provided with a plurality of weirs or partitions whereby the water flowing therethrough is made to surge or eddy, flume connections between the upper ends of the reaction receptacle and the settling receptacle and between the upper ends of the settling receptacle and collecting receptacle, and skimming means disposed in advance of the last mentioned flume connection.

12. In a system of the character described, a plurality of receptacles comprising a mixing receptacle, a reaction receptacle, a settling receptacle, a collecting receptacle, the mixing receptacle being superposed on the reaction receptacle and communicating therewith, weirs arranged in the mixing receptacle, in the path of the outflowing water, a solution-holding container mounted on the mixing receptacle and adapted to discharge the solution at a point adjacent the weirs in said mixing receptacle, means controlled by the water level in the mixing receptacle for regulating the quantity of solution discharging into the mixing receptacle, and valve-controlled ramified piping arranged in the bottoms of the reaction receptacle and the settling receptacle for withdrawing the sediment or sludge therefrom.

13. In a system of the character described, a treating solution holding receptacle having an outlet, a disc valve, rotatably mounted on the side wall of said receptacle, provided with a segmental cut-away portion adapted to register with the outlet, said disc valve being provided with a radially disposed arm whereby the disc valve is normally moved into outlet uncovering position, float means connected with said arm and normally adapted to move the latter with the disc valve into outlet covering position, and tiltably mounted means in said receptacle, operable through the impact of the inflowing fluid, for dislodging solids at said outlet.

14. A system of the character described, comprising a plurality of receptacles constituting a mixing receptacle, a reaction receptacle, a settling receptacle, a collecting receptacle, and a sludge receiving receptacle, the reaction receptacle and settling receptacle and the settling receptacle and the collecting receptacle having communication with each other adjacent to the tops thereof, the mixing receptacle being adapted to have the water flow therefrom and to discharge into the lower end of the reaction receptacle, the mixing receptacle being provided with a plurality of weirs or partitions arranged at different horizontal planes whereby the water is given a series of falls in its flow through said mixing receptacle ramified conduits disposed along the bottoms of the reaction receptacle and the settling receptacle for withdrawing the precipitate or sediment therefrom, valved connections between said conduits and the sludge receiving receptacle for conveying the precipitate or sediment to said receptacle, and skimming means at the point of communication between the settling receptacle and the collecting receptacle.

15. A system of the character described, comprising a plurality of receptacles constituting, respectively a mixing receptacle, a reaction receptacle and a settling receptacle, a collecting receptacle, a sludge receptacle, the reaction receptacle and settling receptacle and the settling receptacle and the collecting receptacle having commuication with each other adjacent to the tops thereof, with the communication between the settling receptacle and the reaction receptacle and between the settling receptacle and the collecting receptacle being arranged at diametrically opposite points, the reaction receptacle and the settling receptacle being provided with conduits along their bottoms communicating with the sludge receptacle, said conduits in both receptacles comprising a main line provided with branch lines or conduits disposed laterally therefrom at acute angles thereto, relative to the inner end of the main line said main line and the branch lines being each tapered toward the unconnected ends thereof and all provided with inlet openings at predetermined points throughout the lengths thereof.

16. In a system of the character described, a reaction receptacle, a settling receptacle and a sludge receptacle, valved conduits disposed along the bottoms of the reaction receptacle and the settling receptacle connected with the sludge receptacle, the conduits comprising a main line provided with a plurality of laterally disposed branch lines extending at an obtuse angle to the main line so that flow through the branch lines will be in a direction toward the outlet end of the main line, with all of said conduits being tapered toward the unattached ends thereof and each provided with series of openings along the lower sides thereof.

17. A system of the character described, comprising a water and treating solution receiving receptacle, means arranged in said receptacle whereby self agitation of and mixing of the treating solution with the water during its flow through the receptacle is induced, means whereby the quantity of treating solution admitted is controlled by the quantity of water in said receptacle, and a reaction receptacle adapted to receive the treated water from the first receptacle, said reaction receptacle being formed to retard the flow therethrough without inducing agitation therein.

18. In a system of the character described, a water and treating solution receiving receptacle, means arranged in said receptacle whereby self agitation of the water during flow through said receptacle is induced, and means, operable by the level of the water flowing through said receptacle, for introducing the treating solution into said receptacle in predetermined quantities proportionate to the quantity of water in said receptacle.

ANDREW W. ANDERSON.
JAY R. HICKOX.